United States Patent
Bergh et al.

(10) Patent No.: US 6,186,223 B1
(45) Date of Patent: Feb. 13, 2001

(54) CORRUGATED FOLDED PLATE HEAT EXCHANGER

(75) Inventors: Charles J. Bergh, Berwyn; Peter J. McKee, Downingtown, both of PA (US)

(73) Assignee: Zeks Air Drier Corporation, West Chester, PA (US)

(*) Notice: Under 35 U.S.C. 154(b), the term of this patent shall be extended for 0 days.

(21) Appl. No.: 09/385,493

(22) Filed: Aug. 27, 1999

Related U.S. Application Data

(63) Continuation-in-part of application No. 09/315,096, filed on May 19, 1999.
(60) Provisional application No. 60/098,137, filed on Aug. 27, 1998.

(51) Int. Cl.$^7$ ......................................................... F28D 9/00
(52) U.S. Cl. ........................ 165/165; 165/157; 29/890.03
(58) Field of Search ..................................... 165/164, 165, 165/DIG. 399, 157; 29/890.03

(56) References Cited

U.S. PATENT DOCUMENTS

| | | |
|---|---|---|
| Re. 23,144 | 9/1949 | Andersen . |
| D. 254,506 | 3/1980 | Holmberg . |
| 574,157 | 12/1896 | Ljungstrom . |
| 799,621 | 9/1905 | Brewtnall . |
| 817,490 | 4/1906 | Jarvis . |
| 1,734,274 | 11/1929 | Schubart . |
| 1,777,356 | 10/1930 | Fisher . |
| 1,791,483 | 2/1931 | Dalgliesh . |
| 1,833,166 | 11/1931 | Lucke . |
| 1,853,322 | 4/1932 | Rose . |
| 1,932,950 | 10/1933 | Annis . |
| 2,019,351 | 10/1935 | Lathrop . |
| 2,147,719 | 2/1939 | Simons . |
| 2,288,061 | 6/1942 | Arnold . |
| 2,449,922 | 9/1948 | Andersen . |
| 2,566,928 | 9/1951 | Carter . |
| 2,576,213 | 11/1951 | Chausson . |
| 2,588,500 | 3/1952 | Dugan . |
| 2,610,832 | 9/1952 | Holmes et al. . |

(List continued on next page.)

FOREIGN PATENT DOCUMENTS

| | | | |
|---|---|---|---|
| 2 301 345 | 7/1974 | (DE) . | |
| 2810 094A1 | 10/1978 | (DE) | ................................ F24F/3/14 |
| 30 06 988 A1 | 9/1981 | (DE) | ................................ F28D/9/00 |
| 029573 | 6/1981 | (EP) . | |
| WO 82/00194 | 1/1982 | (EP) | ................................ F28F/3/00 |
| 303 492 A2 | 2/1989 | (EP) | ................................ F25J/3/00 |
| 596599 | 5/1994 | (EP) | ................................ A61M/1/36 |
| 2 269 694 | 11/1975 | (FR) | ................................ F28D/9/00 |
| 2 367 265 | 5/1978 | (FR) | ................................ F28D/9/00 |
| 320279 | 10/1929 | (GB) . | |
| 512689 | 9/1939 | (GB) . | |
| 55-118598 | 3/1979 | (JP) | ................................ F28F/3/08 |
| 6-194082 | 12/1992 | (JP) | ................................ F28F/3/08 |
| 6-194082 | * 7/1994 | (JP) | ............................ 165/DIG. 399 |
| WO 84/03353 | 8/1984 | (WO) . | |
| WO 95/30867 | 11/1995 | (WO) . | |

OTHER PUBLICATIONS

Walas Chemical Process Equipment "Selection and Design" 1988 p. 434.

*Primary Examiner*—Allen Flanigan
(74) *Attorney, Agent, or Firm*—Caesar, Rivise, Bernstein, Cohen & Pokotilow, Ltd.

(57) ABSTRACT

An apparatus and method are described for thoroughly sealing off the extreme ends of a corrugated folded plate (core) heat exchanger. Instead of using end caps to seal off the two ends of the heat exchanger, the ends are first compressed or "crushed" into a vertical seam, thereby maximizing the density of the core. The crushed ends are then pinched and/or trimmed and the seam is then welded closed. Another variation is to spin the ends of the heat exchanger so that the ends taper to a very small opening while also maximizing the density of the core. The small opening is then welded shut.

7 Claims, 2 Drawing Sheets

U.S. PATENT DOCUMENTS

| | | |
|---|---|---|
| 2,953,110 | 9/1960 | Etheridge ............................. 113/118 |
| 2,990,162 | 6/1961 | Otten . |
| 3,040,500 | 6/1962 | Walker et al. . |
| 3,104,218 | 9/1963 | Speidel et al. . |
| 3,176,762 | 4/1965 | Greenwood et al. . |
| 3,240,268 | 3/1966 | Armes . |
| 3,282,334 | 11/1966 | Stahlheber . |
| 3,292,691 | 12/1966 | Welter et al. . |
| 3,331,435 | 7/1967 | Valyi . |
| 3,369,592 | 2/1968 | Dedow . |
| 3,372,743 | 3/1968 | Pall et al. . |
| 3,399,719 | 9/1968 | Forrest et al. . |
| 3,403,727 | 10/1968 | Becker . |
| 3,508,607 | 4/1970 | Hermann . |
| 3,532,161 | 10/1970 | Lockel . |
| 3,540,702 | 11/1970 | Uyama . |
| 3,568,462 | 3/1971 | Hoffman et al. . |
| 3,626,481 | 12/1971 | Taylor et al. . |
| 3,640,340 | 2/1972 | Leonard et al. . |
| 3,720,071 | 3/1973 | Nasser et al. . |
| 3,731,737 | 5/1973 | Jenssen . |
| 3,734,177 | 5/1973 | Bellovary et al. . |
| 3,757,856 | 9/1973 | Kun . |
| 3,759,322 | 9/1973 | Nasser et al. . |
| 3,785,620 | 1/1974 | Huber . |
| 3,808,104 | 4/1974 | Davidson . |
| 3,849,076 | 11/1974 | Gryanzov et al. . |
| 3,907,032 | 9/1975 | DeGroote et al. . |
| 3,941,188 | 3/1976 | Scheidl . |
| 3,963,810 | 6/1976 | Holmberg et al. . |
| 3,992,168 | 11/1976 | Toyama et al. . |
| 3,996,102 | 12/1976 | Thome . |
| 4,013,121 | 3/1977 | Berger et al. . |
| 4,058,161 | 11/1977 | Trepaud . |
| 4,083,695 | 4/1978 | Haese et al. . |
| 4,090,918 | 5/1978 | Masetti . |
| 4,099,928 | 7/1978 | Norback . |
| 4,116,271 | 9/1978 | De Lepereire ....................... 165/166 |
| 4,128,221 | 12/1978 | Straffi . |
| 4,154,295 | 5/1979 | Kissinger . |
| 4,176,713 | 12/1979 | Fisher . |
| 4,186,159 | 1/1980 | Huber . |
| 4,212,351 | 7/1980 | Van Hagan et al. . |
| 4,246,962 | 1/1981 | Norback . |
| 4,254,827 | 3/1981 | Forster et al. . |
| 4,286,366 | 9/1981 | Vinyard . |
| 4,291,759 | 9/1981 | Sumitomo . |
| 4,296,050 | 10/1981 | Meier . |
| 4,301,864 | 11/1981 | Kivikas et al. . |
| 4,303,123 | 12/1981 | Skoog . |
| 4,307,779 | 12/1981 | Johansson et al. . |
| 4,311,187 | 1/1982 | Small . |
| 4,354,551 | 10/1982 | Kristoffersson et al. . |
| 4,374,542 | 2/1983 | Bradley . |
| 4,384,611 | 5/1983 | Fung . |
| 4,433,721 | 2/1984 | Biaggi . |
| 4,450,904 | 5/1984 | Volz . |
| 4,455,339 | 6/1984 | Meier . |
| 4,460,388 | 7/1984 | Fukami et al. . |
| 4,470,455 | 9/1984 | Sacca . |
| 4,501,321 | 2/1985 | Real et al. . |
| 4,574,007 | 3/1986 | Yearout et al. . |
| 4,582,130 * | 4/1986 | Modschieder ................... 165/104.33 |
| 4,597,916 | 7/1986 | Chen . |
| 4,599,097 | 7/1986 | Petit et al. . |
| 4,604,247 | 8/1986 | Chen et al. . |
| 4,606,745 | 8/1986 | Fujita . |
| 4,646,822 | 3/1987 | Voggenreiter et al. . |
| 4,657,072 | 4/1987 | Mulock-Bentley . |
| 4,699,212 | 10/1987 | Andersson et al. . |
| 4,715,431 | 12/1987 | Schwarz et al. . |
| 4,781,248 | 11/1988 | Pfeiffer . |
| 4,804,040 | 2/1989 | Jan-Ove et al. . |
| 4,813,478 | 3/1989 | Jonsson et al. . |
| 4,848,451 | 7/1989 | Jonsson et al. . |
| 4,874,039 | 10/1989 | Nilsson . |
| 4,911,235 | 3/1990 | Andersson et al. . |
| 4,915,165 | 4/1990 | Dahlgren et al. . |
| 4,945,981 | 8/1990 | Joshi . |
| 4,950,430 | 8/1990 | Chen et al. . |
| 4,966,227 | 10/1990 | Andersson . |
| 4,981,621 | 1/1991 | Pluss . |
| 4,987,955 | 1/1991 | Bergqvist et al. . |
| 5,088,552 | 2/1992 | Raunio . |
| 5,100,448 | 3/1992 | Lockett et al. . |
| 5,154,859 | 10/1992 | Bosquain et al. . |
| 5,174,370 | 12/1992 | Hallgren . |
| 5,178,207 | 1/1993 | Bergqvist et al. . |
| 5,188,773 | 2/1993 | Chen et al. . |
| 5,224,351 | 7/1993 | Jeannot et al. . |
| 5,226,473 | 7/1993 | Knutsson et al. . |
| 5,226,474 | 7/1993 | Hallgren . |
| 5,262,095 | 11/1993 | Bosquain et al. . |
| 5,267,444 | 12/1993 | Lehman et al. . |
| 5,700,403 | 12/1997 | Billingham et al. . |
| 5,732,460 | 3/1998 | Paternoster et al. . |
| 5,876,638 | 3/1999 | Sunder et al. . |
| 6,059,023 * | 5/2000 | Kurematsu ........................... 165/165 |

\* cited by examiner

CORRUGATED FOLDED PLATE HEAT EXCHANGER

RELATED APPLICATIONS

This application is CIP of U.S. application Ser. No. 09/315,096 filed May 19, 1999 entitled CORRUGATED FOLDED PLATE HEAT EXCHANGER APPARATUS (which is assigned to the same Assignee of the present patent application, namely, Zeks Air Drier Corporation), which, in turn, is based on U.S. Provisional Patent Application No. 60/098,137 filed on Aug. 27, 1998, also entitled CORRUGATED FOLDED PLATE HEAT EXCHANGER APPARATUS and all of whose entire disclosures are incorporated by reference herein.

FIELD OF THE INVENTION

The present invention relates to heat exchangers and more specifically to improvements in heat exchange devices.

BACKGROUND OF THE INVENTION

In heat exchangers where parallel or counter flow operation of two isolated fluids (e.g., a refrigerant and air) is used, the inlet and outlet ports of the heat exchanger for these flows are disposed inward of the extreme ends of the heat exchanger vessel. Furthermore, where these heat exchangers use internal parallel plates for performing the heat exchanging between the flows, the ends of the plates are disposed at the ends of the heat exchanger. Thus, it is very important that the extreme ends of the heat exchanger vessel, including the plate ends, need to be thoroughly sealed to maintain the isolation of the two fluids. Although end caps may be brazed, or through-welded, to the ends of the heat exchanger to provide thorough sealing, the dispersed plate ends do not provide a readily dense surface to which the end caps can seal thoroughly. Thus, there remains a need for an improved manner of thoroughly sealing the extreme ends of such heat exchangers that maintains the requisite fluid isolation, that is more resistant to internal pressure forces and that is more cost effective.

OBJECTS OF THE INVENTION

Accordingly, it is the general object of this invention to provide an invention that overcomes the disadvantages of the prior art.

It is an object of the present invention to provide an apparatus and method for thoroughly sealing the extreme ends of a corrugated folded heat exchanger.

It is still yet a further object of the present invention to provide an apparatus and method that thoroughly seals the extreme ends of a corrugated folded heat exchanger in order to maintain the isolation of the two heat exchanging fluids.

It is still yet another object of the present invention to provide an apparatus and method that thoroughly seals the extreme ends of a corrugated folded heat exchanger in order to improve the resistance to internal pressure forces.

It is a further object of the present invention to provide an apparatus and method that improves the quality of the sealing of the extreme ends of a corrugated folded heat exchanger.

It is still yet another object of the present invention to provide an apparatus and method that reduces the manufacturing costs for thoroughly sealing the extreme ends of a corrugated folded heat exchanger.

It is a further object of this invention to provide an apparatus and method that utilizes welding, rather than brazing, in order to thoroughly seal the extreme ends of a corrugated folded heat exchanger.

It is still a further object of this invention to provide an apparatus and method for maximizing the density of the corrugated folded core of the heat exchanger in order to thoroughly seal the extreme ends of the heat exchanger.

SUMMARY OF INVENTION

These and other objects of the instant invention are achieved by providing a heat exchanger that comprises: (a) an elongated housing (e.g., stainless steel, etc. that has a thickness to withstand high, internal pressure) having a first set of inlet and outlet ports for circulating a first medium (e.g., air) through the housing and a second set of inlet and outlet ports for circulating a second medium (e.g., refrigerant) through the housing and where the housing has an interior wall and two extreme ends; and (b) a core comprising a continuous sheet (e.g., a corrosion-resistant, temperature resistant, low cost material such as stainless steel, titanium, etc.) having corrugations running angularly to the direction of the sheet and wherein the sheet is folded such that each of the folds is in contact with the interior wall to form alternating isolated channels within the housing. The alternating isolated channels comprise a first set of channels that is in fluid communication with the first set of ports and a second set of channels that is in fluid communication with the second set of ports and wherein the first and second media form parallel flows within the respective sets of channels. The continuous sheet comprises ends that are disposed at the extreme ends of the housing and wherein each of the extreme ends are compressed to maximize the density of the core and to form a respective seam in said housing at each of said extreme ends that is welded closed.

These and other objects of the instant invention are also achieved by providing a heat exchanger that comprises: (a) an elongated housing (e.g., stainless steel, etc. that has a thickness to withstand high, internal pressure) having a first set of inlet and outlet ports for circulating a first medium (e.g., air) through the housing and a second set of inlet and outlet ports for circulating a second medium (e.g., refrigerant) through the housing and where the housing has an interior wall and two extreme ends; and (b) a core comprising a continuous sheet (e.g., a corrosion-resistant, temperature resistant, low cost material such as stainless steel, titanium, etc.) having corrugations running angularly to the direction of the sheet and wherein the sheet is folded such that each of the folds is in contact with the interior wall to form alternating isolated channels within the housing. The alternating isolated channels comprise a first set of channels that is in fluid communication with the first set of ports and a second set of channels that is in fluid communication with the second set of ports and wherein the first and second media form parallel flows within the respective sets of channels. The continuous sheet comprises ends that are disposed at the extreme ends of the housing and wherein each of the extreme ends are tapered down to maximize the density of the core and to form a reduced opening in said housing at each of the extreme ends that is welded closed.

These and other objects of the instant invention are also achieved by providing a method for providing a heat exchanger for supporting heat exchange between two fluid media. The method comprises: (a) providing a continuous sheet (e.g., a corrosion resistant, temperature resistant, low cost material such as stainless steel, titanium, etc.) having corrugations running angularly to the direction of the sheet and wherein the continuous sheet has a first end and a second end; (b) providing a first elongated housing shell having a first set of input and output ports for a first medium flow and a second elongated housing shell having a second set of input and output ports for a second medium flow and wherein the shells (e.g., stainless steel, etc. that has a thickness to withstand high, internal pressure) have side edges for joining together to form a housing having an interior wall and a hollow interior and wherein the housing comprises two extreme ends; (c) folding the continuous sheet, excluding the ends, into a plurality of folds such that each one of the plurality of folds is in contact with the interior wall when the folded sheet is positioned in the hollow interior; (d) positioning the folded continuous sheet into the first elongated housing shell so that each one of the ends of the continuous sheet is positioned on a respective side edge of the first elongated housing shell and wherein the first and second ends of the folded continuous sheet are coincident with a respective one of the two extreme ends; (e) joining (e.g., welding) the second elongated housing shell to the first elongated housing shell along their side edges; (f) compressing each of the two extreme ends to maximize the density of the folded continuous sheet and to form a seam in the housing at each of the extreme ends; and (g) welding each of the seams closed.

These and other objects of the instant invention are also achieved by providing a method for providing a heat exchanger for supporting heat exchange between two fluid media. The method comprises:(a) providing a continuous sheet (e.g., a corrosion-resistant, temperature resistant, low cost material such as stainless steel, titanium, etc.) having corrugations running angularly to the direction of the sheet and wherein the continuous sheet has a first end and a second end; (b) providing a first elongated housing shell having a first set of input and output ports for a first medium flow and a second elongated housing shell having a second set of input and output ports for a second medium flow and wherein the shells (e.g., stainless steel, etc. that has a thickness to withstand high, internal pressure) have side edges for joining together to form a housing having an interior wall and a hollow interior and wherein the housing comprises two extreme ends; (c) folding the continuous sheet, excluding the ends, into a plurality of folds such that each one of the plurality of folds is in contact with the interior wall when the folded sheet is positioned in the hollow interior; (d) positioning the folded continuous sheet into the first elongated housing shell so that each one of the ends of the continuous sheet is positioned on a respective side edge of the first elongated housing shell and wherein the first and second ends of the folded continuous sheet are coincident with a respective one of the two extreme ends; (e) joining (e.g., welding) the second elongated housing shell to the first elongated housing shell along their side edges; (f) spinning each of the two extreme ends to taper down each of the two extreme ends to a reduced opening while maximizing the density of the folded continuous sheet; and (g) welding each of the reduced openings closed.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENTS

Figures 5, 6:
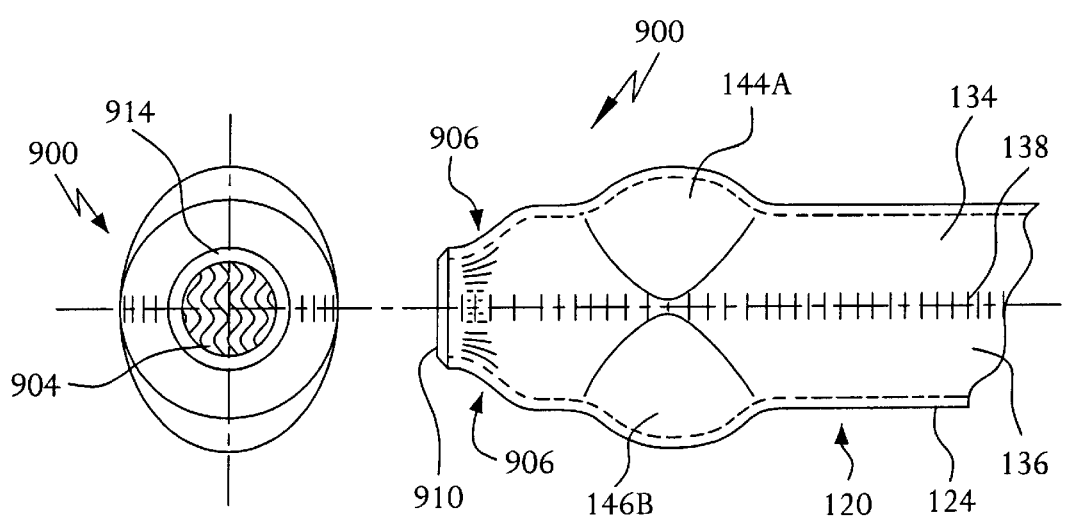
FIG. 5 is an end view of the corrugated folded heat exchanger depicting a third embodiment of the end closure of the pressure vessel.
FIG. 6 is a side view of the corrugated folded heat exchanger depicting the third embodiment of the end closure of the pressure vessel.

The improvement described in this application is directed to the end closure of corrugated folded plate heat exchanger 120 of A.Ser. No. 09/315,096. In particular, three embodiments of the end closure are described herein, namely, a first embodiment end closure 700 (FIGS. 1–2), a second embodiment end closure 800 (FIGS. 3–4) and a third embodiment end closure (FIGS. 5–6).

Figures 1, 2:
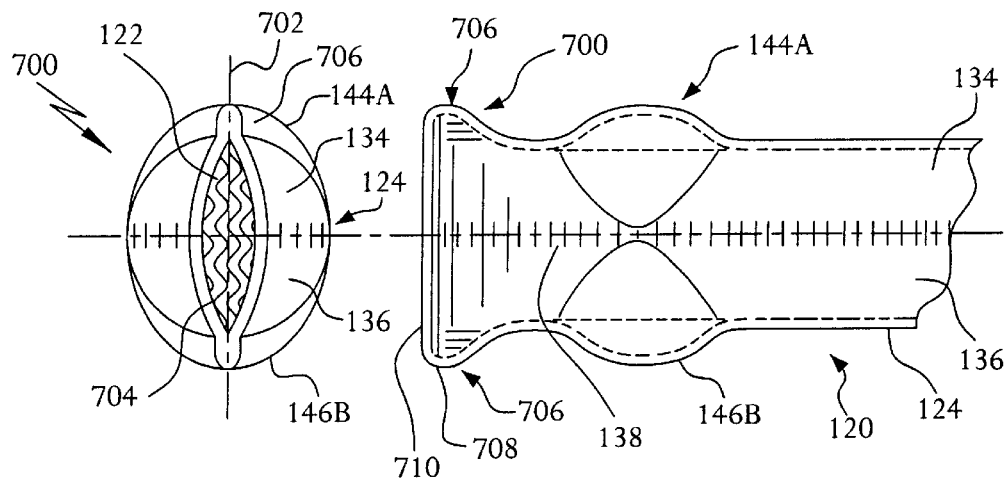
FIG. 1 is an end view of the corrugated folded heat exchanger depicting a first embodiment of the end closure of the pressure vessel.
FIG. 2 is a side view of the corrugated folded heat exchanger depicting the first embodiment of the end closure of the pressure vessel.

As described in A.Ser. No. 09/315,096, the heat exchanger 120 basically comprises a pressure vessel 124 in which there is disposed a single, folded and corrugated sheet known as the "core" 122, a portion of which can seen in FIG. 1. The pressure vessel 124 comprises a pair of shells 134/136 that are welded together, as indicated by side seam 138. As also discussed in A. Ser. No. 09/315,096, the pressure vessel 124 comprises two sets of inlet and outlet ports: one set for a first fluid flow, e.g., refrigerant, and one set for a second fluid flow, e.g., air. FIG. 1 shows one inlet port 144A of the first set and one outlet port 146B of the second set that provide access to the core 122. The two ends (only one which is shown in FIG. 2) of the pressure vessel 124 therefore need to be tightly sealed off. As also described in A. Ser. No. 09/315,096, these ends are sealed off with end caps (not shown) that are secured to the ends of the core 122 via an internal braze joint (e.g., nickel) or via a plurality of through-welds from the exterior wall of the end caps to the end of the core 122.

One improvement to these types of end caps is shown by the first embodiment 700 in FIGS. 1–2. In particular, each end (only one of which is shown in FIGS. 1–2) of the pressure vessel 124 is first compressed or "crushed" to form a vertically-oriented seam, indicated by the line 702. By compressing the ends of the pressure vessel 124 is such a manner, the core 122 itself is compressed to its maximum density as shown by reference number 704. The crushed end(s) of the pressure vessel 124 forms a "fish-tail" appearance (also known as "projections") indicated by reference number 706. Once compressed into this "fish-tail" condition, the excess shell material is pinched flat and trimmed to obtain a flat surface on the core 122 and vessel 124, as indicated by reference number 708. Next, metal is welded onto the dense, flat end surface as indicated by the reference number 710 to seal the end(s) of the pressure vessel 124 against the internal pressure.

Figures 3, 4:
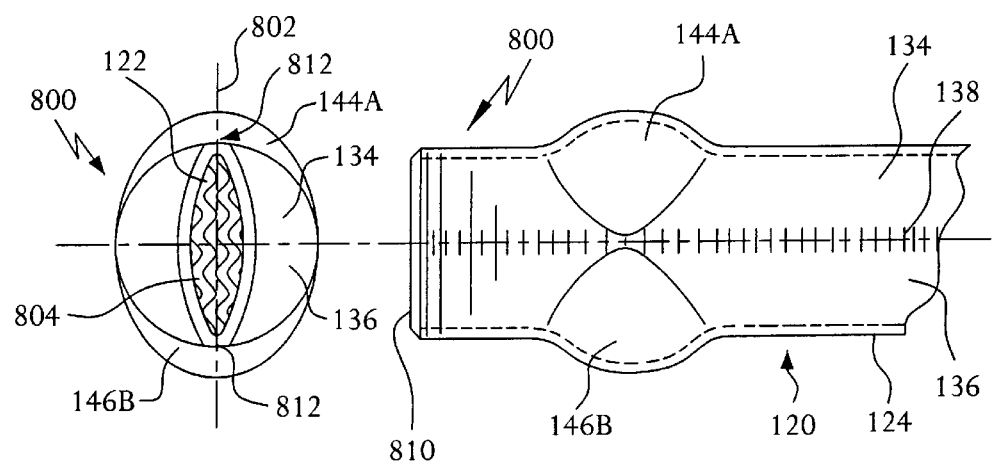
FIG. 3 is an end view of the corrugated folded heat exchanger depicting a second embodiment of the end closure of the pressure vessel.
FIG. 4 is a side view of the corrugated folded heat exchanger depicting the second embodiment of the end closure of the pressure vessel.

The second embodiment 800 of this end closure is shown in FIGS. 3–4. In particular, the ends (only one of which is shown) of the pressure vessel 124 are again compressed or "crushed" as in the first embodiment 700, thereby crushing the core 122 to its maximum density 804 also. However, in this case, the projections that form the "fish-tail" appearance (706, FIG. 1) in the first embodiment 700 are removed and welded shut as indicated by reference number 812. As with the first embodiment 700, the vertical seam indicated by reference number 802 (FIG. 3) is also welded shut as indicated by reference number 810 (FIG. 4).

The third embodiment 900 of this end closure is shown in FIGS. 5–6. In particular, the ends (only one of which is shown) of the pressure vessel 124 are "spun" to taper (indicated by reference number 906) the ends of the pressure vessel 124 so that the ends taper to a very small opening 914 while also compressing or crushing the core 122 to its maximum density 904. Once the maximum density 904 is achieved the small opening(s) 914 is welded closed, as indicated by reference number 910.

Each of the above embodiments has the advantages of eliminating the need for end caps, improving the resistance to pressure forces, having seals formed by welding rather than brazing and reducing manufacturing costs.

Without further elaboration, the foregoing will so fully illustrate our invention that others may, by applying current or future knowledge, readily adopt the same for use under various conditions of service. Even though particular embodiments of the invention have been illustrated and described herein, it is not intended to limit the invention and changes and modifications may be made therein within the scope of the following claims:

We claim:

1. A heat exchanger comprising:

an elongated housing having a first set of inlet and outlet ports for circulating a first medium through said housing and a second set of inlet and outlet ports for circulating a second medium through said housing, said housing having an interior wall and two extreme ends;

a core comprising a continuous sheet having corrugations running angularly to the direction of said sheet and wherein said sheet is folded such that each of said folds is in contact with said interior wall to form alternating isolated channels within said housing, said alternating isolated channels comprising a first set of channels that is in fluid communication with said first set of ports and a second set of channels that is in fluid communication with said second set of ports, said first and second media forming parallel flows within said respective sets of channels, said continuous sheet comprising ends that are disposed at said extreme ends; and each of said extreme ends being compressed to maximize the density of said core and to form a respective seam in said housing at each of said extreme ends that is welded closed.

2. The heat exchanger of claim 1 wherein said compressed extreme ends form projections that are pinched flat, trimmed away and sealed.

3. A heat exchanger comprising:

an elongated housing having a first set of inlet and outlet ports for circulating a first medium through said housing and a second set of inlet and outlet ports for circulating a second medium through said housing, said housing having an interior wall and two extreme ends;

a core comprising a continuous sheet having corrugations running angularly to the direction of said sheet and wherein said sheet is folded such that each of said folds is in contact with said interior wall to form alternating isolated channels within said housing, said alternating isolated channels comprising a first set of channels that is in fluid communication with said first set of ports and a second set of channels that is in fluid communication with said second set of ports, said first and second media forming parallel flows within said respective sets of channels, said continuous sheet comprising ends that are disposed at said extreme ends; and each of said two extreme ends being tapered down to maximize the density of said core and to form a reduced opening in said housing at each of said extreme ends that is welded closed.

4. A method for providing a heat exchanger for supporting heat exchange between two fluid media:

(a) providing a continuous sheet having corrugations running angularly to the direction of the sheet, said continuous sheet having a first end and a second end;

(b) providing a first elongated housing shell having a first set of input and output ports for a first medium flow and a second elongated housing shell having a second set of input and output ports for a second medium flow, said shells having side edges for joining together to form a housing having an interior wall and a hollow interior and wherein said housing comprises two extreme ends;

(c) folding said continuous sheet, excluding the ends, into a plurality of folds such that each one of said plurality of folds is in contact with said interior wall when said folded sheet is positioned in said hollow interior;

(d) positioning said folded continuous sheet into said first elongated housing shell so that each one of said ends of said continuous sheet is positioned on a respective side edge of said first elongated housing shell and wherein said first and second ends of said folded continuous sheet are coincident with a respective one of said two extreme ends;

(e) joining said second elongated housing shell to said first elongated housing shell along their side edges;

(f) compressing each of said two extreme ends to maximize the density of said folded continuous sheet and to form a seam in said housing at each of said extreme ends; and (g) welding each of said seams closed.

5. The method of claim 4 wherein said step of compressing each of said two extreme ends further comprises pinching flat any projections formed by said compressing step.

6. The method of claim 5 wherein said step of compressing each of said two extreme ends further comprises trimming away said pinched flat projections.

7. A method for providing a heat exchanger for supporting heat exchange between two fluid media:

(a) providing a continuous sheet having corrugations running angularly to the direction of the sheet, said continuous sheet having a first end and a second end;

(b) providing a first elongated housing shell having a first set of input and output ports for a first medium flow and a second elongated housing shell having a second set of input and output ports for a second medium flow, said shells having side edges for joining together to form a housing having an interior wall and a hollow interior and wherein said housing comprises two extreme ends;

(c) folding said continuous sheet, excluding the ends, into a plurality of folds such that each one of said plurality of folds is in contact with said interior wall when said folded sheet is positioned in said hollow interior;

(d) positioning said folded continuous sheet into said first elongated housing shell so that each one of said ends of said continuous sheet is positioned on a respective side edge of said first elongated housing shell and wherein said first and second ends of said folded continuous sheet are coincident with a respective one of said two extreme ends;

(e) joining said second elongated housing shell to said first elongated housing shell along their side edges;

(f) spinning each of said two extreme ends to taper down each of said two extreme ends to a reduced opening while maximizing the density of said folded continuous sheet; and (g) welding each of said reduced openings closed.

* * * * *